United States Patent [19]

Diner

[11] Patent Number: 5,065,236

[45] Date of Patent: Nov. 12, 1991

[54] STEREOSCOPIC CAMERA AND VIEWING SYSTEMS WITH UNDISTORTED DEPTH PRESENTATION AND REDUCED OR ELIMINATED ERRONEOUS ACCELERATION AND DECELERATION PERCEPTIONS, OR WITH PERCEPTIONS PRODUCED OR ENHANCED FOR SPECIAL EFFECTS

[75] Inventor: Daniel B. Diner, So. Pasadena, Calif.

[73] Assignee: The United States of America as represented by the Administrator of the National Aeronautics and Space Administration, Washington, D.C.

[21] Appl. No.: 608,452

[22] Filed: Nov. 2, 1990

[51] Int. Cl.$^5$ .......................................... H04N 13/00
[52] U.S. Cl. ...................................... 358/88; 358/91; 358/92
[58] Field of Search ................... 358/88, 89, 91, 92; 364/522

[56] References Cited

U.S. PATENT DOCUMENTS

| 4,647,965 | 3/1987 | Imsand | 358/88 |
| 4,704,627 | 11/1987 | Yuyama et al. | 358/88 |
| 4,723,159 | 2/1988 | Imsand | 358/92 |
| 4,819,064 | 4/1989 | Diner | 358/88 |
| 4,905,081 | 2/1990 | Morton | 358/92 |

OTHER PUBLICATIONS

D. B. Diner and M. von Sydow, "Static Stereo Vision Depth Distortions in Teleoperation," Ergonomics of Hybrid Automated Systems I, edited by W. Karwowski, H. R. Parsaei and M. R. Wilhelm, Elsevier Science Publishers B. V., Amsterdam, 1988, pp. 227–232.

D. B. Diner and M. von Sydow, "Stereo Depth Distortions in Teleoperation," JPL Publication 87-1, Rev. 1, Jet Propulsion Laboratory, Pasadena, CA, May 15, 1988.

Linda M. Strunk and Taro Iwamoto, "A Linearly-Mapping Stereoscopic Visual Interface for Teleoperation," IEEE International Workshop on Intelligent Robots and Systems, IROS'90, pp. 429–436.

Primary Examiner—Victor R. Kostak
Assistant Examiner—Glenton B. Burgess
Attorney, Agent, or Firm—Thomas H. Jones; Harold W. Adams; John R. Manning

[57] ABSTRACT

Methods for providing stereoscopic image presentation and stereoscopic configurations using stereoscopic viewing systems having converged or parallel cameras may be set up to reduce or eliminate erroneously perceived accelerations and decelerations by proper selection of parameters, such as an image magnification factor q and intercamera distance 2w. For converged cameras, q is selected to be equal to Ve−qwl=0, where V is the camera convergence distance, e is half the interocular distance of an observer, w is half the intercamera distance and l is the actual distance from said first nodal point of each camera to said convergence point, and for parallel cameras, q is selected to be equal to e/w. While converged cameras cannot be set up to provide fully undistorted three-dimensional views, they can be set up to provide a linear relationship between real and apparent depth and thus minimize erroneously perceived accelerations and decelerations for three sagittal planes, x=−w, x=0 and x=+w which are indicated to the observer. Parallel cameras can be set up to provide fully undistorted three-dimensional views by controlling the location of the observer and by magnification and shifting of left and right images. In addition, the teachings of this disclosure can be used to provide methods of stereoscopic image presentation and stereoscopic camera configurations to produce a nonlinear relation between perceived and real depth, and erroneously produce or enhance perceived accelerations and decelerations in order to provide special effects for entertainment, training or educational purposes.

36 Claims, 8 Drawing Sheets

Dynamics of a Teleoperated Vehicle, at 0.5 Second Intervals

| A. Cameras Converged at 5.00, meters 2w=2.00 meters For initial velocity of 100 cm/sec ||| 
|---|---|---|
| Distance (m) | Velocity (cm/sec) | Acceleration (cm/sec)$^2$ |
| 10.00 | 100 | 0 |
| 9.50 | 100 | 0 |
| 9.00 | 100 | 0 |
| 8.50 | 100 | 0 |
| 8.00 | 100 | 0 |
| 7.50 | 100 | 0 |
| 7.00 | 100 | 0 |
| 6.50 | 100 | 0 |
| 6.00 | 100 | 0 |
| 5.50 | 100 | 0 |
| 5.00 | 100 | 0 |
| 3.04 | 684 | 1168 |
| -5.87 | 2880 | 4392 |

| B. Cameras Converged at 10.00 meters, 2w=2.00 meters For initial velocity of 100 cm/sec ||| 
|---|---|---|
| Distance (m) | Velocity (cm/sec) | Acceleration (cm/sec)$^2$ |
| 10.00 | 100 | 0 |
| 9.50 | 100 | 0 |
| 8.70 | 219 | 239 |
| 6.87 | 514 | 588 |
| 2.40 | 1274 | 1521 |
| -9.08 | 3319 | 4090 |

| C. Cameras Converged at 10.00 meters, 2w=2.00 meters For initial velocity of 10 cm/sec ||| 
|---|---|---|
| Distance (m) | Velocity (cm/sec) | Acceleration (cm/sec)$^2$ |
| 10.00 | 10 | 0 |
| 9.95 | 10 | 0 |
| 9.89 | 13 | 5 |
| 9.82 | 16 | 7 |
| 9.73 | 21 | 10 |
| 9.60 | 29 | 15 |
| 9.43 | 40 | 22 |
| 9.19 | 57 | 35 |
| 8.83 | 86 | 57 |
| 8.28 | 134 | 98 |
| 7.39 | 222 | 176 |
| 5.86 | 390 | 336 |
| 3.06 | 730 | 680 |
| -2.42 | 1463 | 1466 |

FIG. 3

Velocity of a Teleoperated Vehicle
at the beginning of the 0.5 Second Interval of Collision

| Camera Configuration | | Initial Velocity at 10M Distance (cm/sec) | | |
|---|---|---|---|---|
| | | 100 | 10 | 1 |
| V (m) | 2w (m) | Actual Velocity at 1 M Distance(cm/sec) | | |
| | | Monitor Magnification Factor = 1.0 | | |
| 5.00 | 0.60 | 1022 | 594 | 444 |
| 5.00 | 2.00 | 684 | 814 | 534 |
| 10.00 | 0.60 | 888 | 372 | 62 |
| 10.00 | 2.00 | 1274 | 730 | 376 |
| | | Monitor Magnification Factor = Ve/w$\ell$ | | |
| 5.00 | 0.60 | 100 | 10 | 1 |
| 5.00 | 2.00 | 100 | 10 | 1 |
| 10.00 | 0.60 | 100 | 10 | 1 |
| 10.00 | 2.00 | 100 | 10 | 1 |

5,065,236

STEREOSCOPIC CAMERA AND VIEWING SYSTEMS WITH UNDISTORTED DEPTH PRESENTATION AND REDUCED OR ELIMINATED ERRONEOUS ACCELERATION AND DECELERATION PERCEPTIONS, OR WITH PERCEPTIONS PRODUCED OR ENHANCED FOR SPECIAL EFFECTS

ORIGIN OF THE INVENTION

The invention described herein was made in the performance of work under a NASA contract, and is subject to the provisions of Public Law 96-517 (35 USC 202) in which the Contractor has elected not to retain title.

TECHNICAL FIELD

The invention relates to stereoscopic camera and viewing systems for three-dimensional image presentation with undistorted depth information, and particularly for reducing or eliminating erroneously perceived accelerations and decelerations, or for producing or enhancing erroneously perceived accelerations and decelerations for special effects.

REFERENCES

1. Diner, D. B., and von Sydow, M., 1988 "Stero depth distortions in teleoperation," JPL Publication 87-1, Rev. 1, Jet Propulsion Laboratory—NASA, U.S.A National Technical Information Service #87N18985; Proceedings of the Twenty-Second Annual Conference on Manual Control, AFWAL-TR-86-3093, Wright-Patterson AFB Aeronauticals Labs, Ohio, 1986.
2. Diner, D. B. and von Sydow, M., "Static Stero Vision Depth Distortions in Teleoperation," Ergonomics of Hybrid Automated Systems I, Elsevier Science Publishers B. V., Amsterdam, 1988.
3. Strunk, L. M. and Iwamotor, T., "A Linearly-Mapping Stereoscopic Visual Interface for Teleoperation," IEEE International Workshop on Intelligent Robots and Systems, 1990.

BACKGROUND ART

A major need in teleoperation is the undistorted presentation of depth information in stereoscopic image displays, such as stereoscopic television or stereoscopic motion pictures. When a human operator views a three-dimensional television monitor, predictable depth distortions are possible [1–2]. In fact, for almost all stereoscopic camera and viewing systems, these distortions exist. These depth distortions introduce erroneous perceptions of acceleration or deceleration which can lead to collisions when a human operator uses a three dimen sional viewing system as the primary viewing system to drive a teleoperated vehicle and/or operate a teleoperated robotic device. These depth distortions can be avoided by using camera and viewing configurations disclosed in accordance with this invention.

STATEMENT OF THE INVENTION

An object of this invention is to provide an optimum stereoscopic camera configuration and viewing system for a human operator in a wide variety of situations, such as to control a vehicle or robot in motion relative to an object without perceived distortions in depth and without erroneously perceived accelerations or decelerations.

A detailed mathematical analysis of perceived depth has been conducted and camera configurations and image presentation techniques have been derived which reduce or eliminate distortions in depth and thus reduce erroneously perceived accelerations and decelerations.

Converged stereoscopic cameras cannot provide fully undistorted three-dimensional views of the viewed region of interest (e.g., the workspace). However, converged cameras can be set up to minimize erroneously perceived accelerations and decelerations for three saggittal planes in the region of interest, namely at $x = -w$, $x = 0$ and $x = +w$ (which are indicated to the observer by an overlay of indicia displayed on the screen) if $Ve - qwl$ is set equal to zero by selection of q, an image display scaling factor where:

V is the camera convergence distance,
e is half the interocular distance of an observer,
w is half the intercamera distance, and
l is the actual distance from the camera first nodal point to the camera convergence point.

This may result in lower depth resolution, but high depth resolution (with erroneously perceived accelerations or decelerations) may be simultaneously achieved by display of the stereoscopic image on a second larger screen with a large scaling factor q such that $Ve - qwl < 0$.

Parallel stereoscopic cameras can provide fully undistorted 3-D views of the viewed region by shifting of the left and right camera images, the left image to the left and the right image to the right, until the images of objects at infinity are separated on the display screen by the distance 2e, the observer's interocular distance, and by controlling the location of the observer. One can also control the perceived depth (in front of, on or behind the monitor screen) of a fronto-parallel plane of interest in the scene by magnifying and shifting the images as well as controlling the location of the observer. For true-to-scale, three-dimensional images, the scale factors of the image's height, width and depth must be equal. This can be achieved by setting the observer's distance, s, from the display screen equal to qD, where D is the viewing distance of the cameras focused upon a plane $y = D$ of interest. In that manner, parallel cameras with shifted and magnified stereoscopic images can provide fully undistorted stereoscopic views of objects with control of the perceived depth of the plane of interest. These undistorted views will have no erroneously perceived accelerations and decelerations in the viewed region. Therefore, remote vehicle or robot control will be free of any risk of collisions caused by these effects.

For image presentations where more than one observer views the image, such as 3-D movies designed for entertainment, educational or training purposes, the interocular distance 2e will be selected to be appropriate to the expected interocular distances of the observing group. Therefore, variations in the interocular distances of simultaneous observers will result in corresponding variations in the accuracy of the observer's perceived three-dimensional views. For high precision needs, systems are best designed for a single observer or a group of observers with equal interocular distances. This invention provides methods of stereoscopic image presentation and stereoscopic camera configurations to create or enhance erroneously perceived accelerations and decelerations in order to provide special effects for entertainment, training or educational purposes.

The novel features that are considered characteristic of this invention are set forth with particularity in the appended claims. The invention will best be understood from the following description when read in connection with the accompanying drawings.

BRIEF DESCRIPTION OF THE DRAWINGS

FIG. 3 illustrates a table that simulates a remotely driven vehicle approaching a stationary object.

FIG. 6a illustrates parallel cameras viewing a region of interest while

DETAILED DESCRIPTION OF THE INVENTION

Figure 1:
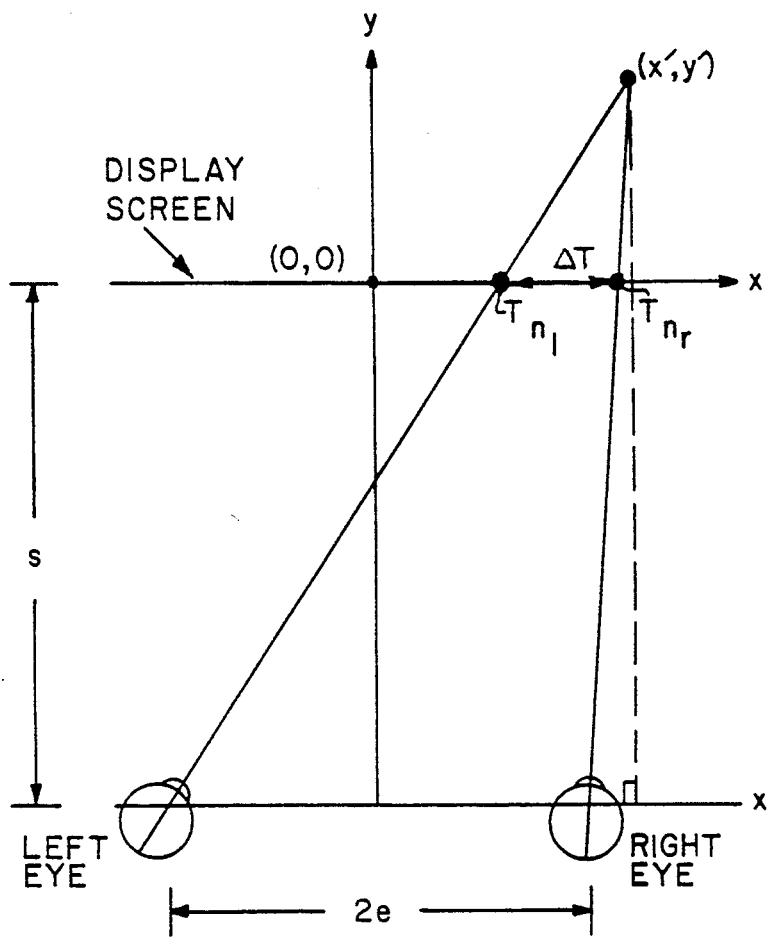
FIG. 1 illustrates schematically an observer with interocular distance 2e viewing a flat 3-D image display screen from a distance s.

FIG. 1 illustrates schematically the left and right eyes of an observer with interocular distance 2e viewing a flat 3-D image display screen, such as a television monitor or motion picture screen from a distance s. The dots $T_{nl}$ and $T_{nr}$ are the locations of the corresponding left and right images displayed on a screen of an object in the viewed region (not shown) located at (x,y). Location (x', y'), which may be in front of or behind the screen, is defined such that a point at (x, y) in the viewed region will appear to be at (x', y') in the perceived stereoscopic space. Restricting this discussion to the ocular convergence plane, i.e., the plane including the first nodal points of the eyes and the ocular convergence point at (x', y'), first define the horizontal screen disparity $\Delta T = T_{nr} - T_{nl}$ (assuming that the eyes are level with the center of the screen that is in the plane of the paper). The apparent depth of the object from the display screen $$y' = \frac{s \Delta T}{2e - \Delta T}. \quad (1)$$

The derivations for Equation (1) are for flat screens. For curved screens, such as in most television monitors, additional corrections must be introduced.

The denominator of Equation (1) is the difference between the observer's interocular distance 2e and the horizontal screen disparity $\Delta T$. It is positive for all left and right image pairs which have a well-defined apparent depth y' referred to hereinafter as fusible images.

The numerator of Equation (1) can be positive or negative and will predict whether the 3-D image of the object appears to be behind or in front of the screen. Images with equal horizontal screen disparity $\Delta T$ have equal apparent depth y' which is a function of the interocular distance 2e of the observer. Humans have a mean interocular distance of about 6.5 cm with a standard deviation of about ±1 cm.

It is evident from FIG. 1 that apparent depth y' goes to infinity as the horizontal monitor disparity $\Delta T$ approaches the observer's interocular distance 2e. Consequently, the operator's interocular distance is very important. Suppose that stereo cameras viewing two objects were configured such that one object's image had 6.5 cm of horizontal screen disparity and the other object's image had 6.7 cm of horizontal screen disparity. Then an observer with a greater interocular distance of, e.g., 6.9 cm, could easily discriminate the depth difference of the two objects, but an observer with a smaller interocular distance of, e.g., 6.3 cm, would not be able to locate either object in depth. Attention must be given to magnification of the object's image on the monitor screen.

Figure 2B:
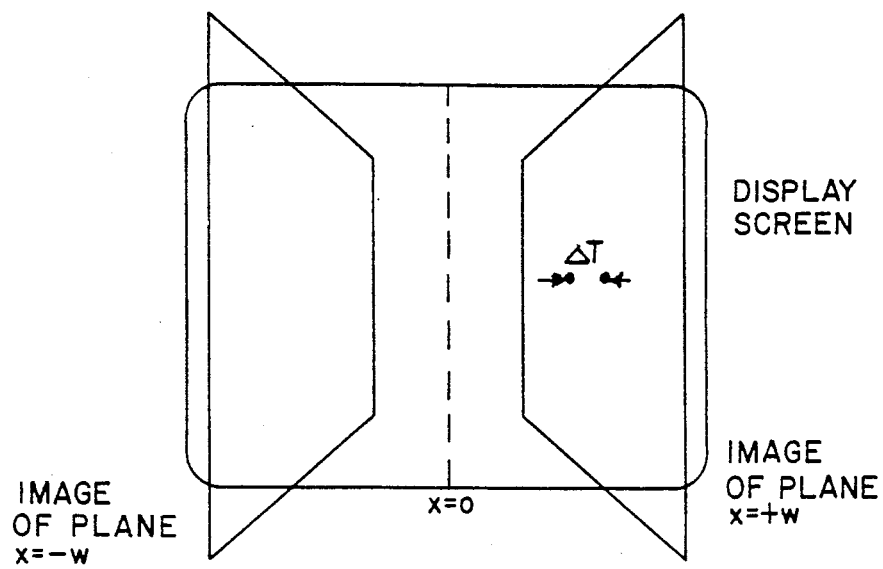
FIG. 2b illustrates a stereoscopic image display on a display screen with overlays used to help an observer locate three sagittal planes, $x = -w$, $x = 0$ and $x = +w$.
Figure 2A:
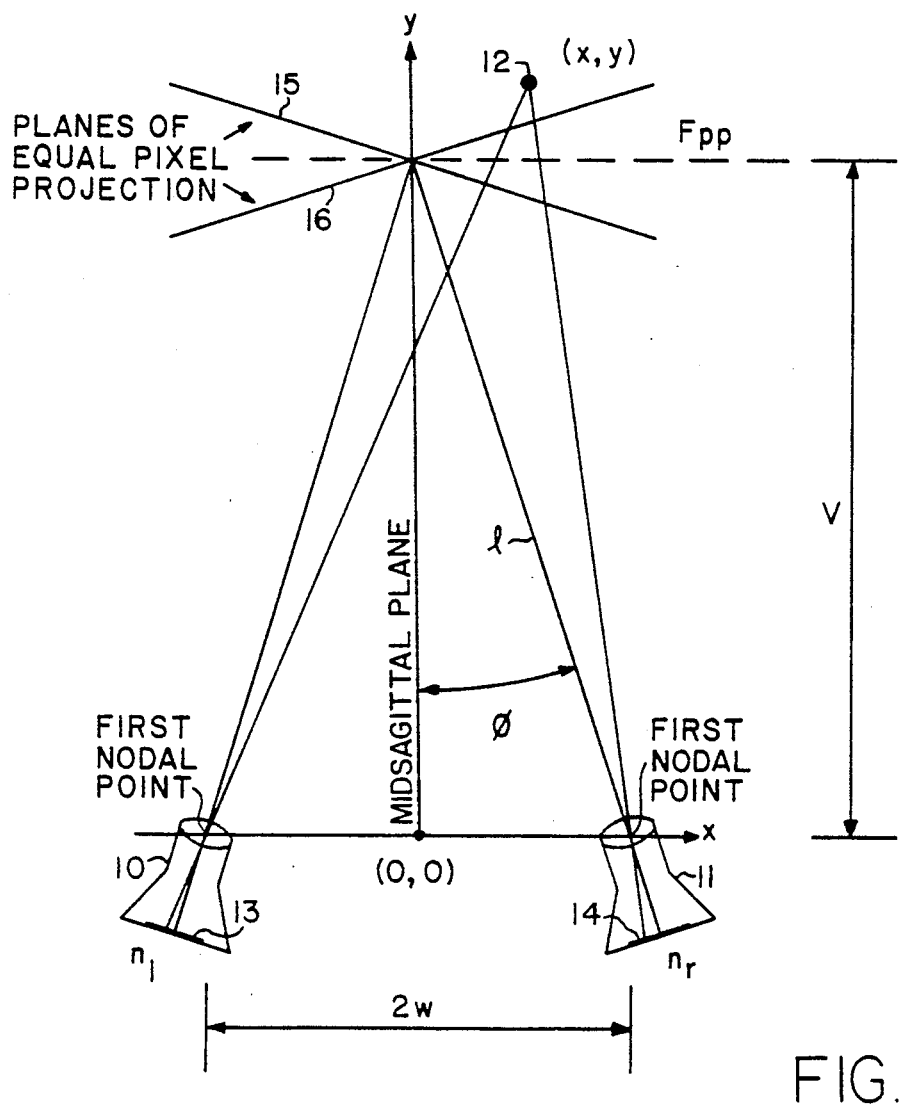
FIG. 2a illustrates a converged pair of television cameras viewing a region of interest.

To consider the apparent location of stereoscopic images from cameras 10 and 11, converged at the camera convergence angle $2\phi$, shown in FIG. 2a, first define q to be the monitor magnification factor, i.e., the scale expansion between distances on the camera's plane of equal pixel projection in the viewed region and distances on the television monitor screen. If a centimeter on the plane of equal pixel projection of the camera is displayed on the screen as 2 cm wide, then q=2. Clearly q is a function of the focal length of the lens, the camera-to-object viewing distance, the size of the screen, and the size of the portion of the screen on which the image is presented.

It can be shown that apparent depth $$y' = \frac{qswl[(Vy + w^2)(y - V) + Vx^2]}{e[(Vy + w^2)^2 - w^2x^2] - qwl[(Vy + w^2)(y - V) + Vx^2]} \quad (2a)$$

w = half the intercamera distance,

V = the camera convergence distance from the first nodal points of the cameras to a fronto-parallel plane $F_{pp}$ of interest, and l = the actual distance from the first nodal point of each camera to the camera convergence point which determines the distance V of the fronto-parallel plane $F_{pp}$ which is parallel to the x axis passing through the first nodal points of the cameras. Note the dimensions of the camera image collection plates 13 and 14 and the focal length of the camera lenses will determine the extent of the viewed portion of the planes 15 and 16 of equal pixel projections, which are perpendicular to the plane of the paper as are the camera image collection plates as shown schematically in the figure.

Considering that the stereoscopic pair of television cameras 10 and 11 are shown coverged on a location in the region of interest, Equation (2a) states that x, the off-axis distance of an object represented by a dot 12, influences the perceived depth of the object. This explains the observation that flat objects appear convexly curved when viewed by converged stereo cameras.

Consider the midsagittal plane of the cameras, i.e., the plane at x=0. Then Equation (2a) for apparent depth reduces to $$y' = \frac{qswl(y - V)}{e(Vy + w^2) - qwl(y - V)} \quad (2b)$$

ORTHOSTEREOSCOPIC DISTORTION

The orthostereocopic camera configuration is defined as the camera configuration which is geometrically identical to the configuration of the observer's eyes observing the 3-D image screen.

Equation (2a) quantifies the orthostereoscopic distortion. Let w=e, and V=s. The screen size and the focal length must also be chosen so that distances in each camera's plane of equal pixel projection are identical to distances on the screen, that is q=1. Equation (2a) for apparent depth becomes $$y' = \frac{Vl[(Vy + w^2)(y - V) + Vx^2]}{[(Vy + w^2)^2 - w^2x^2] - l[(Vy + w^2)(y - V) + Vx^2]} \quad (2c)$$

The depth distortion is not zero. To see this, take the simple case of y=V, the fronto-parallel plane of convergence.

$$y'(F_{pp}) = \frac{V^2lx^2}{l^4 - (lV + w^2)x^2} \quad (3)$$

which is not zero distortion of the plane. An undistorted plane of apparent depth would be of the form y'=k, a constant, i.e., independent of x, and for the fronto-parallel plane of convergence, y'=0. It is thus seen that the orthostereoscopic camera configuration is simply one more camera configuration with apparent depth (y') distortions.

APPARENT DEPTH CHANGES OF MOVING OBJECTS WITH CONVERGED CAMERAS

As an object moves towards or away from the stereoscopic camera system, that object is perceived to move towards or away from the viewer. However, the change of apparent depth may not be linear with respect to the change in real depth. The first and second derivatives of apparent depth y' with respect to real depth y at x=0 are $$\frac{dy'}{dy} = \frac{qswl^3e}{[(Ve - qwl)y + ew^2 + qwlV]^2} > 0 \quad (4)$$

and $$\frac{d^2y'}{dy^2} = \frac{-2qswl^3e[Ve - qwl]}{[(Ve - qwl)y + ew^2 + qwlV]^3} \quad (5)$$

The first derivative Equation (4) states that as y increases the first derivative increases. This fact is the basis of stereoscopic television. Farther things appear farther away, and closer things appear closer.

By definition, V<1. However, for fixed w, increasing V lessens the proportional difference between V and l. The inter-viewpoint distance, 2 w, could be set less than the observer's interocular distance, 2e, and although this may greatly decrease depth resolution, it reduces dynamic depth distortion.

As long as (Ve−qwl)<0, the second derivative from Equation (5) is positive. This is because the denominator is positive for fusible left and right images of an object displayed on a screen. Consider what this means in terms of apparent velocity and apparent acceleration. From calculus it is known that $$\frac{dy'}{dt} = \frac{dy'}{dy} \cdot \frac{dy}{dt} \quad (6)$$

and $$\frac{d^2y'}{dt^2} = \frac{dy'}{dy} \cdot \frac{d^2y}{dt^2} + \frac{d^2y'}{dy^2} \left(\frac{dy}{dt}\right)^2 . \quad (7)$$

Thus, $$\frac{dy'}{dt} = \frac{qswl^3e}{[(Ve - qwl)y + ew^2 + qwlV]^2} \cdot \frac{dy}{dt} \quad (8)$$

Equation (8) shows that the apparent velocity is not constant for a constant real velocity in depth, dy/dt, in the viewed region, but is an inverse square function of y multiplied by the real velocity. This can be a very troublesome source of operator error. To consider the effect on apparent accelerations, consider the second derivative of apparent depth with respect to time.

$$\frac{d^2y'}{dt^2} = \frac{qswl^3e}{[(Ve - qwl)y + ew^2 + qwlV]^2} \cdot \frac{d^2y}{dt^2} + \\ \frac{-2qswl^3e[Ve - qwl]}{[(Ve - qwl)y + ew^2 + qwlV]^3} \left(\frac{dy}{dt}\right)^2 . \quad (9)$$

Equation (9) shows that apparent acceleration is not constant for a constant real acceleration on the midsagittal plane, x=0, in the viewed region but is an inverse-square function of y times the real acceleration plus an inverse-cubed function of y times the real velocity squared.

Suppose an operator is controlling a teleoperated vehicle in space and wants to approach an object with a constant velocity. Assume that the operator can control the velocity and the acceleration of the vehicle. The operator will attempt to keep the vehicle acceleration equal to zero, but will perceive an apparent deceleration and will erroneously accelerate the vehicle as the vehicle approaches the object. To see this mathematically, set Equation (9) equal to zero and solve for the second derivative of depth with respect to time.

$$\frac{d^2y}{dt^2} = \frac{2[Ve - qwl]}{(Ve - qwl)y + ew^2 + qwlV} \left(\frac{dy}{dt}\right)^2 . \quad (10)$$

Equation (10) will be less than zero for fusible images with (Ve−qwl)<0.

Note that Equation (10) does not describe the acceleration of the vehicle but acceleration of the y-component of the distance between the vehicle and the object. The frame of reference which defines y is the midpoint between the front nodal points of the camera which is attached to the vehicle. For the purpose of analyzing the dynamics of the vehicle, define a new frame of mutually perpendicular axes (A,B,C) such that the vehicle is traveling along the B axis in the positive direction. Then accelerations of the vehicle towards the object will equal positive accelerations along the B axis. Also, as the vehicle increases the B value of its location, the y value of the object decreases by the same amount. That is y = −B+E, where E is constant, $$\frac{dy}{dt} = -\frac{dB}{dt}, \qquad (11)$$

and $$\frac{d^2y}{dt^2} = -\frac{d^2B}{dt^2}. \qquad (12)$$

Now $$\frac{d^2B}{dt^2} = -\frac{d^2y}{dt^2} = \frac{2(qwl - Ve)}{(Ve - qwl)y + ew^2 + qwlV} \left(\frac{dy}{dt}\right)^2 \qquad (13)$$

or $$\frac{d^2B}{dt^2} = -\frac{d^2y}{dt^2} = \qquad (14)$$

$$\frac{2(qwl - Ve)}{(Ve - qwl)(E - B) + ew^2 + qwlV} \left(\frac{dB}{dt}\right)^2$$

Equation (14) is >0 for fusible images with (Ve−qwl)<0. Now the situation is clear. The operator will accelerate the vehicle, and the faster the vehicle is traveling, the more the operator will accelerate it. That situation can be dangerous!

A teleoperated vehicle with a pair of 3-D television cameras 2 meters apart converged at 20 meters and presenting their 3-D image to a screen ½ meter wide will satisfy the condition (Ve−qwl)<0, provided less than 15.3 meters of each camera's line of equal pixel projection is presented to the monitor.

The table shown in FIG. 3 simulates the dynamics of a teleoperated vehicle by setting forth distance to the object, velocity and acceleration of the vehicle at 0.5 second intervals for three different camera configurations with the vehicle approaching a stationary object located 10 meters away and starting with an initial velocity of 100 cm/sec. In parts A and B of the table, the cameras are converged at 5.0 and 10.0 meters, respectively. The operator has a 6.5 cm interocular distance and is viewing a stereoscopic television monitor from a distance s of one meter. The intercamera distance (2w) is 2 meters and the monitor magnification factor q=1. Unlimited vehicle power is assumed, as is an operator-system response time of 0.5 seconds.

Part A of the table shows that, until stereoscopic image fusion is achieved, no erroneous acceleration occurs, but once this fusion is achieved the accelerations increase very rapidly resulting in collisions (negative distance between the vehicle and the object). Part B of the table begins with fused stereoscopic images, the condition (2e−ΔT)>0 is satisfied, and so the acceleration begins almost immediately after the first 0.5 second interval. Part C of the table simulates the same camera configuration of Part B with an initial velocity of 10 cm/sec. Because the erroneous accelerations are a function of the instantaneous velocity, the accelerations are smaller but still increase rapidly and lead to collision.

Similarly, suppose an object approaches the vehicle with a constant velocity. By Equation (9), the operator would perceive it to be decelerating. This could be tragic in terms of collision avoidance. The table in FIG. 3 also simulates this scenario.

Now set (Ve−qwl)=0. Equations (8) and (9) become $$\frac{dy'}{dt} = \frac{sV}{l^2} \cdot \frac{dv}{dt}, \qquad (15)$$

and $$\frac{d^2y'}{dt^2} = \frac{sV}{l^2} \cdot \frac{d^2v}{dt^2}. \qquad (16)$$

Also, Equation (2a) for x=0 and Ve=qwl becomes $$y' = \frac{sV}{l^2}(y - V). \qquad (17)$$

Now, apparent and real distance, velocity and acceleration are linearly related by the scaling factor $sV/l^2$.

Figures 4, 5:
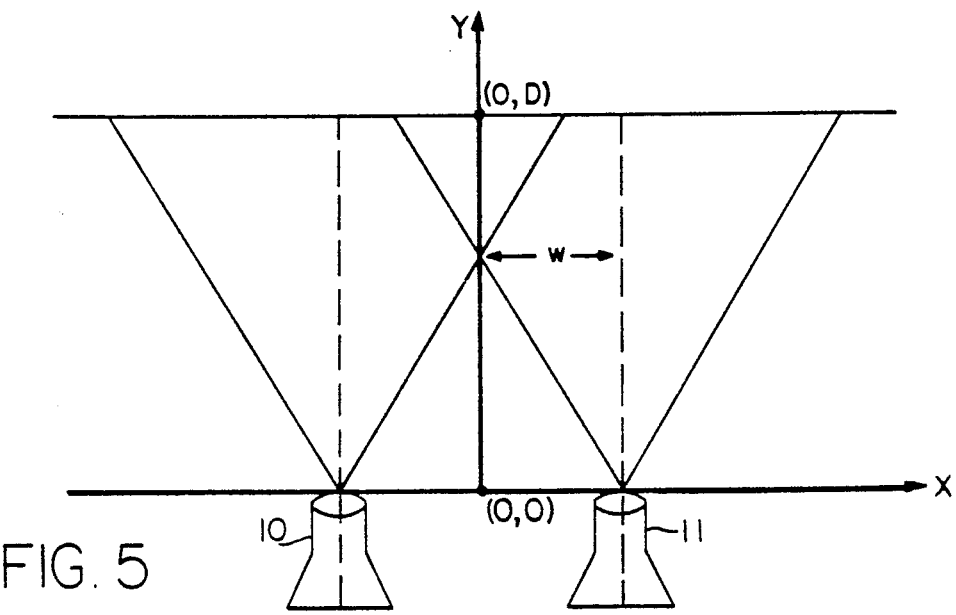
FIG. 4 illustrates a table that simulates the same vehicle in the table of FIG. 3 and shows the velocity of the vehicle at the beginning of the 0.5 second interval of collision for a variety of converged camera configurations and initial vehicle velocities.
FIG. 5 illustrates a parallel pair of stereo cameras viewing a region of interest.

A table shown in FIG. 4 simulates the same vehicle as the table in FIG. 3 and shows the velocity of the vehicle at the beginning of the 0.5 second interval of collision for a variety of converged camera configurations and three initial vehicle velocities at 100, 10 and 1 cm/sec. In all cases of the three velocities when q=Ve/wl, no erroneous accelerations occur if an object in the plane x=0 is observed during driving.

The above derivations have only been shown for x=0. Consider now the entire camera convergence plane. Taking the first and second derivatives of Equation (2a) and setting Ve=qwl yields $$\frac{dy'}{dy} = \frac{sV}{l^2}\left(1 + \frac{(w^2 - x^2)x^2}{(Vy + w^2 - x^2)^2}\right) \qquad (18)$$

and $$\frac{d^2y'}{dy^2} = \frac{-2sV^2x^2(w^2 - x^2)}{l^2(Vy + w^2 - x^2)^3}. \qquad (19)$$

Now, $$\frac{dy'}{dt} = \frac{dy'}{dy} \cdot \frac{dy}{dt} + \frac{dy'}{dx} \cdot \frac{dx}{dt} \qquad (20)$$

and dx/dt=0 for an approaching, nontranslating object, so $$\frac{d^2y'}{dt^2} = \frac{dy'}{dy} \cdot \frac{d^2y}{dt^2} + \frac{d^2y'}{dy^2}\left(\frac{dy}{dt}\right)^2 \qquad (21)$$

and $$\frac{dy'}{dt} = \frac{sV}{l^2}\left(1 + \frac{(w^2 - x^2)x^2}{(Vy + w^2 - x^2)^2}\right)\frac{dv}{dt}. \qquad (22a)$$

$$\frac{d^2y'}{dt^2} = \frac{sV}{l^2}\left(1 + \frac{(w^2 - x^2)x^2}{(Vy + w^2 - x^2)^2}\right)\frac{d^2v}{dt^2} - \qquad (22b)$$

$$\frac{2sV^2x^2(w^2 - x^2)}{l^2(Vy + w^2 - x^2)^3}\left(\frac{dy}{dt}\right)^2.$$

As noted above, at $x=0$, things are well behaved. Equations (18) through (23) also show that at $x=+w$ and $x=-w$ things also are well-behaved. However, if one tried to approach an object with a constant velocity, unless some part of the object remained in one of the three sagittal planes, $x=-w$, $x=0$ or $x=+w$ it would be difficult. Setting the left side of Equation (22b) equal to 0 yields $$\frac{d^2y}{dt^2} = \frac{2Vx^2(w^2-x^2)}{(Vy+w^2-x^2)((Vy+w^2)^2-w^2x^2-2Vyx^2)}\left(\frac{dy}{dt}\right)^2 \quad (23)$$

An object which rests in a fronto-parallel plane will appear to warp about three vertical lines as the stereoscopic camera rig approaches the object. Operators must be trained to understand this, even for configurations where $Ve=qwl$.

In summary, for many reasonable coverging camera configurations, as objects move toward a converged stereoscopic camera system with a constant velocity, they will appear to decelerate. Conversely, as objects move away from a converged stereoscopic camera system with a constant velocity, they will appear to accelerate. However, if $(Ve-qwl)=0$, objects in the three planes $x=-w$, $x=0$, $x=w$, moving in depth with a fixed velocity are perceived as moving with a fixed velocity. Thus, in accordance with the present invention, if velocity judgements are critical, one should set a converged stereoscopic camera system up with $Ve-qwl=0$, even at the expense of lowering depth resolution. Graphic overlays, or some other device, on the stereoscopic image can be used to help the teleoperator locate the three sagittal planes $x=-w$, $x=0$, $x=+w$, as shown in FIG. 2b.

However, if one needs high depth resolution and also reliable velocity information, one can choose a camera configuration which yields high depth resolution and display the images on two monitors, one large and one small. That is, use a large w and a normal monitor with large q for high depth resolution and a small monitor with small q for velocity judgements. Alternatively, q can be adjusted electronically using a large monitor and, for example, a frame buffer. Both images can be shown on one monitor screen and the magnification of each image and the portion of the monitor devoted to each image can be adjusted independently. Any stereoscopic viewing screen, such as a motion picture screen, can be similarly divided into two parts for this purpose.

Alternatively, one can minimize the dynamic depth distortions without any shifting or magnification of images by converging the cameras to the center of the plane of interest and then varying the interviewpoint distance 2 w (without changing the convergence point of the cameras). In this manner, $Ve-qwl$ can be set to zero without any shifting or magnification of images.

APPARENT DEPTH CHANGES OF MOVING OBJECTS WITH PARALLEL CAMERAS

In FIG. 1 the perceived location of depth, $y'$, is dependent on the horizontal monitor disparity $T_{nr}-T_{nl}$, and is independent of the camera configuration which produced the disparity. Converged cameras cannot be set up to give a true scaled representation of the viewed region. However, parallel cameras can.

For parallel cameras 10 and 11, shown in FIG. 5, the convergence distance $V=\infty$. So, define a viewing distance, D, as the perpendicular distance from the center (0,0) of the line between the first nodal points of the lenses of the stereoscopic camera system to the center (0, D) of the region of interest. Focus the cameras 10 and 11 so that the center of the depth of focus lies on the plane $y=D$.

Now it can be shown that $$y' = \frac{-wsqD}{ey+wqD} \quad (24)$$

where q is now defined as the monitor magnification factor for an object located in the plane $y=D$. If the distance of focus (not focal length) is changed to twice the distance D, for example, then q will be halved. An object twice as far away from the cameras will appear half as large on the monitor. Thus, $y'$ is independent of the distance of focus of the cameras. Of course $y'$ depends on the focal length of the lens. The distance of focus and the focal length are independent variables in modern camera lenses. Consider that the distance of focus on a fixed-power lens can be changed, or conversely, that the focal length (zoom) of a lens can be changed while remaining focused upon an object at a fixed distance.

In FIG. 5, it can be seen that all locations y of the viewed region in front of the cameras have $y>0$. Therefore, Equation (24) predicts that all objects at finite distances from the cameras will have negative apparent depth. Only objects at optical infinity will appear to be located in the plane of the surface of the monitor screen. No matter how w, s, q, or D is varied, all apparent images will be perceived in front of or in the plane of the surface of the monitor screen. The left camera's image can never be presented to the left of the right camera's image on the monitor screen.

From Equation (24), $y'$ is independent of x for parallel cameras. However, Equation (24) also shows that for parallel cameras, there is no camera-monitor configuration such that a linear relation can exist between real and apparent depth. However, an image presentation technique exists for parallel cameras which solve the problem by using shifted stereoscopic images, as will now be described.

SHIFTED STEREO IMAGES FOR PARALLEL CAMERAS

Figure 6A:
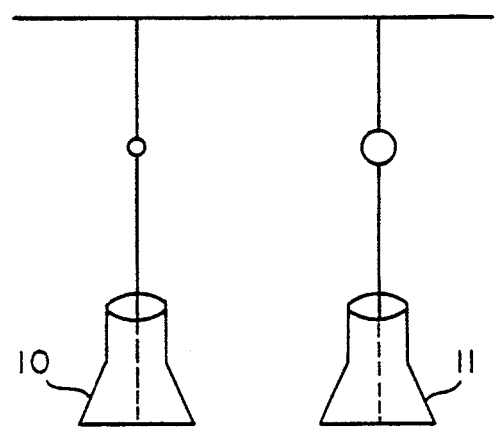
Figure 6B:
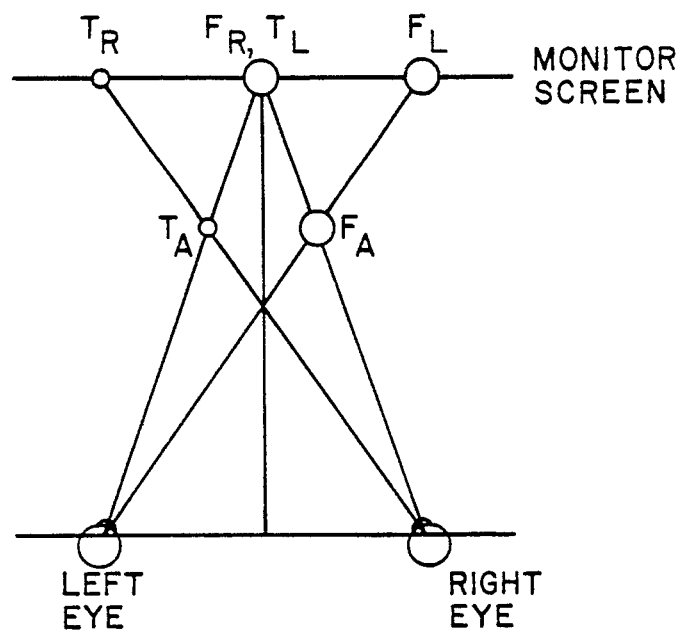
FIG. 6b illustrates an observer's eyes viewing unshifted images and FIG. 6c illustrates the resulting perceived double image of a monitor screen.
Figure 6C:
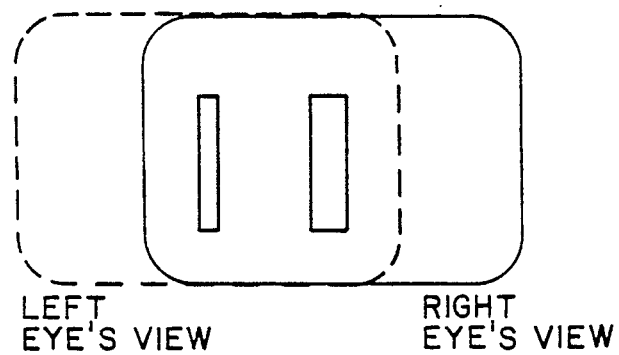

Consider FIG. 6a, which shows two parallel television cameras, viewing a thin and a fat bar having their longitudinal axis perpendicular to the plane of the paper. The thin bar is located directly in front of the left camera, and the fat bar is located directly in front of the right camera. Thus, the left camera presents the thin bar at the center of the monitor shown at $T_L$ in FIG. 6b, and the right camera presents the fat bar at the center of the monitor shown at $F_R$ in FIG. 6b. $T_R$ and $F_L$ are the right camera's image of the thin bar and the left camera's image of the fat bar, respectively. The observer's eyes in FIG. 6b are converged upon the matching images on the monitor and the apparent thin and fat bar images appear between the observer and the monitor screen at $T_A$ and $F_A$. FIG. 6c shows the observer's stereoscopic view with the bars fused but the monitor double. The outline of the left eye's view of the monitor is shown in a heavy dashed line, and the outline of the right eye's view of the monitor is shown as a thin solid line. The left eye's view of the monitor has the thin bar in its center, and the right eye's view of the monitor has the fat bar in its center.

Figure 7A:
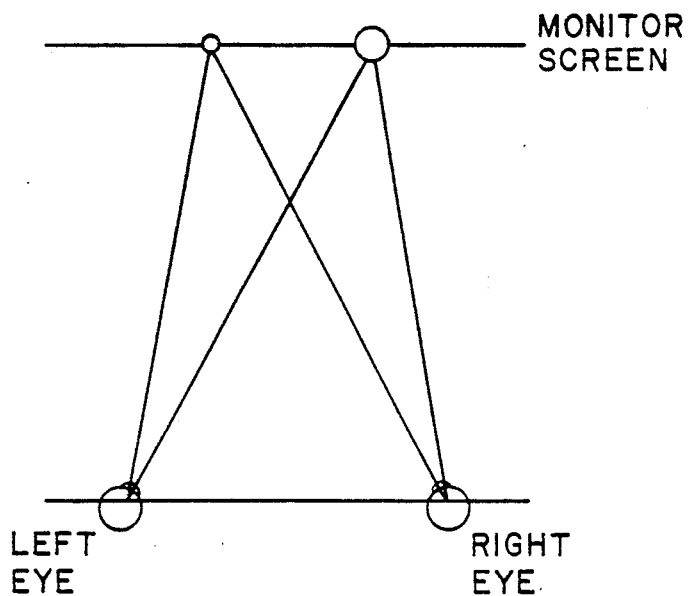
FIG. 7a illustrates an observer's eyes viewing shifted images and FIG. 7b shows the resulting fused image of a monitor screen.
Figure 7B:
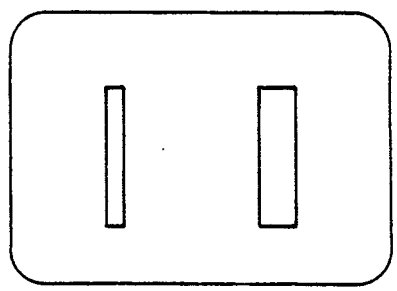

The left camera's image of the bars can now be shifted to the left and the right camera's image of the bars shifted to the right symmetrically until the images overlap on the monitor. This can be done with a frame buffer, for example. FIG. 7a shows the results. The eyes converge on the monitor screen. The result is a satisfactory stereo image, with a single fused image of the television monitor screen as shown in FIG. 7b.

Now one must pay attention to the overlap of the stereo image. By shifting the images, one may have introduced the right edge of the left camera's image on the right side of the screen and the left edge of the right camera's image on the left side of the screen. FIG. 5 shows a top down view of the region of stereo overlap for parallel cameras focused upon the plane y=D. For symmetrically shifted images, this region is centered upon the monitor screen.

When shifting the images for parallel camera viewing, the result is that all the image pairs for locations in some plane y=D will overlap exactly on the monitor. Let this plane be the center of the region of interest and refer to an image presented in this manner as a "shifted stereo image." The effect of the shifted presentation of the image on the perceived depth of objects in the viewed region can now be seen. In FIG. 5, parallel cameras are viewing a plane of interest at distance D.

It can be shown that $$x' = \frac{eqDx}{(e - wq)y + wqD}, \quad (25)$$

$$y' = \frac{wsq(y - D)}{(e - wq)y + wqD}. \quad (26)$$

Clearly, if one sets $q = e/w$, then $$x' = \frac{wq^2Dx}{wqD} = qx, \quad (27)$$

$$y' = \frac{s(y - D)}{D}. \quad (28)$$

Note: $q = e/w$ for parallel cameras if and only if the horizontal monitor disparity $\Delta T$ of images of objects located at infinity equals the observers interocular distance, $2e$.

Figure 8:
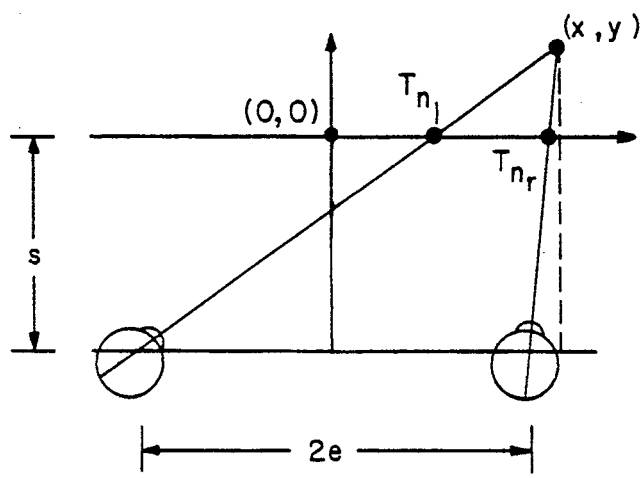
FIG. 8 illustrates the effect of forward head motion on apparent depth of a 3-D image.

The operator viewing distance, $s$, determines the scale factor between $y'$ and $y$. This can be seen by comparing FIGS. 1 and 8 for all camera configurations and in Equations (17) and (28).

Set $s = qD$, then $y' = q(y - D)$, yielding a stereo view with a constant gain in both $x'$ and $y'$ directions. Now consider $z'$. Apparent height is shown below to be constant when $q = e/w$. Also by the definition of $q$, at the distance D, $z' = qz$. Thus, parallel cameras with shifted images can provide fully undistorted 3-D views.

APPARENT HEIGHT OF MOVING OBJECTS

A particularly strange observation in near stereoscopic television viewing is that as objects appear to move away from the observer, they appear to increase in size, and as objects appear to move toward the observer, they appear to decrease in size.

Figure 9:
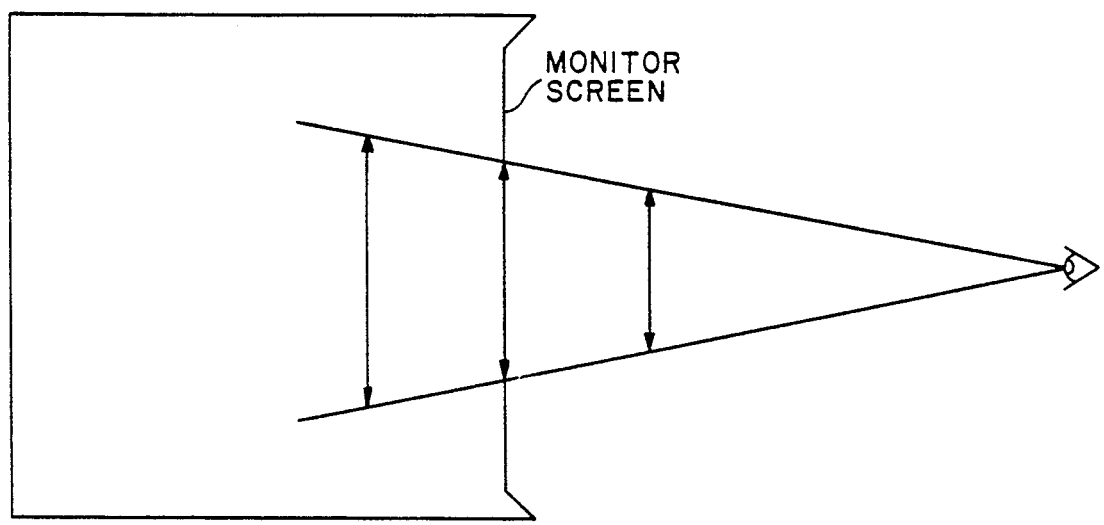
FIG. 9 illustrates the effect of apparent depth on apparent size of an object in the viewed region.

FIG. 9 partially demonstrates this effect. The images of the three arrows shown all have the same height on the monitor screen. The depth difference comes from their horizontal monitor disparity. However, when located in depth, they appear drastically different in size.

One could think of one arrow moving in the viewed region toward the cameras such that its apparent depth passes through the depth locations of the three arrows shown in FIG. 9. The stereoscopic images of this single moving arrow and would differ from the stereoscopic images of the three static arrows only in that, as the single moving arrow approaches the cameras, its image would increase in size. This would offset the shrinking effect illustrated in FIG. 9. The overall change in size, therefore, is a combination of two opposing effects.

When an object moves toward a camera, the size of its image increases proportionally to the inverse of its distance from the camera. If the camera configuration yields a magnified stereoscopic depth greater than 1, then the apparent depth change will be greater than the true depth change. For a fixed viewing distance, wider inter-viewpoint distances increase the magnified stereoscopic depth of a stereoscopic camera system and also increase the distance between the camera and the center of the region of interest. Thus, the effect will be more noticeable for camera configurations with wider inter-viewpoint distances.

Consider, for example, a stereoscopic camera system with $w = 20$ cm viewing a moving object on the y-axis 2 m away. Suppose the object moves 10 cm toward the camera system. Suppose the zoom, monitor size, etc., are such that the magnified stereoscopic depth is 2.0 for an observer sitting 1 m away. Thus, a 20 cm apparent motion, which is 20% of the distance between the observer and the object, is observed. But the object increases its size on the monitor only by about 5%.

In FIG. 9, one sees that the ratio of the final apparent height over the initial apparent height will be $$\frac{z'_f}{z'_i} = \frac{H_f}{H_i} \left( \frac{s + y'_f}{s + y'_i} \right) \quad (29)$$

where $y_f'$ and $y_i'$ are the final and initial apparent depths respectively of the images, and $H_f$ and $H_i$ are the final and initial heights respectively of the images on the monitor. For simplicity, let us consider the ratio of the heights of the arrows above the center horizontal line of the monitor. It can be shown for converged cameras that $$\frac{H_f}{H_i} = \frac{((Vy_i + w^2)^2 - w^2x^2)(Vy_f + w^2)}{((Vy_f + w^2)^2 - w^2x^2)(Vy_i + w^2)}, \quad (30)$$

$$\frac{y'_f + s}{y'_i + s} = \frac{((Vy_f + w^2)^2 - w^2x^2)(e[(Vy_i + w^2)^2 - w^2x^2] - qw[(Vy_i + w^2)(y_i - V) + Vx^2])}{((Vy_i + w^2)^2 - w^2x^2)(e[(Vy_f + w^2)^2 - w^2x^2] - qw[(Vy_f + w^2)(y_f - V) + Vx^2])} \quad (31)$$

and after a bit of manipulation, $$\frac{z'_f}{z'_i} = \frac{((Vy_f + w^2)(e[(Vy_i + w^2)^2 - w^2x^2] - qwl[(Vy_i + w^2)(y_i - V) + Vx^2])}{((Vy_i + w^2)(e[(Vy_f + w^2)^2 - w^2x^2] - qwl[(Vy_f + w^2)(y_f - V) + Vx^2])} \quad (32)$$

On the midline, where $x=0$, $$\frac{z'_f}{z'_i} = \frac{[e(Vy_i + w^2) - qwl(y_i - V)]}{[e(Vy_f + w^2) - qwl(y_f - V)]} \quad (33)$$

In the present example, $$\frac{s + y'_f}{s + y'_i} = \frac{0.8}{1.0} = \frac{4}{5} \quad (34)$$

$$\frac{H_f}{H_i} = 1.052, \quad (35)$$

therefore $$\frac{z'_f}{z'_i} = 0.842 \quad (36)$$

and the approaching object appears to become smaller.

If such an object were to make the indentical motion in real space, as did the stereoscopic image, that is, move towards the observer from 1 m to 80 cm, the visual image of the object upon the retina would increase by about 25% (5/4−1). However, the human eye and brain have a cognitive override which says that objects do not get larger as they approach. They stay the same size. Thus, the brain automatically causes interpretation of the retinal image of approaching objects to change in order to keep the perception of the image size constant. This phenomenon is called "size constancy." This is the $(s+y_f')/(s+y_i')$ term equal to 0.8 in the example above.

In the stereoscopic case described above, the size-constancy function would reduce the perceived size of the object by 20%. However, the retinal image in this case increases only by a factor of 1.052. Thus, the apparent image decreases in size.

For a stereoscopically viewed object which recedes from the cameras, the exact opposite would occur causing the object to appear to become larger.

In the example above, the camera configuration was chosen to demonstrate the size-constancy problem for 3-D television. Optimal camera configurations exist. Setting $(Ve-qwl)=0$ yields $$\frac{z'_f}{z'_i} = 1 \quad \text{for } x = 0, \quad (37a)$$

and $$\frac{z'_f}{z'_i} = \frac{(Vy_f + w^2) y_i}{(Vy_i + w^2) y_f} \quad \text{for } x = \pm w. \quad (37b)$$

Thus, in the sagittal plane $x=0$, size constancy and zero dynamic depth distortion can be achieved. For $x=\pm w$, zero dynamic depth distortion can be achieved, but small apparent size changes will remain.

Now consider for parallel cameras, $$\frac{H_f}{H_i} = \frac{y_i}{y_f}, \quad (38)$$

because the camera image plates are parallel to the planes where y is constant. So $$\frac{z'_f}{z'_i} = \frac{y_i}{y_f} \left( \frac{y'_f + s}{y'_i + s} \right) \quad (39)$$

$$= \frac{y_i \left( \frac{s(y_f - D)}{D} + s \right)}{y_f \left( \frac{s(y_i - D)}{D} + s \right)} = \frac{y_i (sy_f)}{y_f (sy_i)} = 1.$$

That is, apparent height is constant for shifted stereo images with $q=e/w$. Also, by the definition of q, at distance D, $z'=qz$. Therefore, parallel cameras with shifted images can provide fully undistorted 3-D views.

SPECIAL EFFECTS STEREOSCOPIC IMAGING

Although the invention has been presented as methods for reducing or eliminating erroneous perceived accelerations and decelerations, it is evident from all of the foregoing discussion that if instead of so selecting parameters as to reduce or eliminate erroneous accelerations or decelerations, the methods disclosed and claimed may be reversed in the sense of so selecting parameters, such as the magnification factor q and the intercamera distance 2 w, as to produce a nonlinear relation between perceived and real depth, and producing erroneously enhanced perceived accelerations and decelerations. The display on a motion picture or television screen could then be presented to produce special effects, such as a train shown in three-dimensional space rapidly accelerating, when in fact it was moving at a constant speed, or with a small acceleration, when filmed for motion picture projection or television display in 3-D. Consequently, it is intended that the claims cover both reducing or eliminating erroneously perceived accelerations and decelerations as well as a nonlinear relation between perceived and real depth, and erroneously producing or enhancing perceptions of accelerations or decelerations for special effects presentation of stereoscopic images.

AUTOMATION

Figure 10:
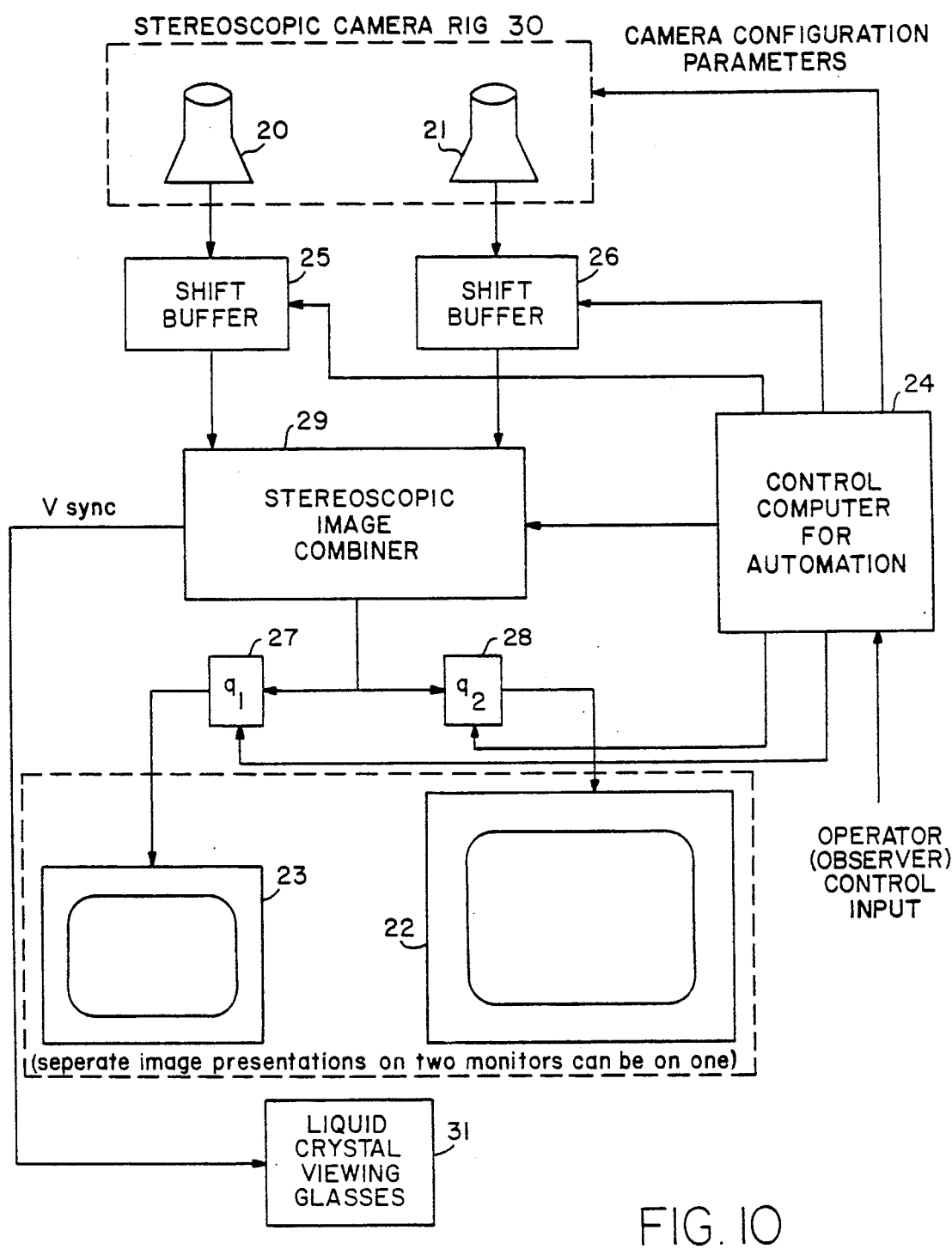
FIG. 10 is a block diagram for a stereoscopic camera system with the ability to adjust all system parameters including camera convergence distance V, intercamera distance w, zoom lens power, the distance of focus of the zoom lenses, and for shifting and magnifying images for display.

In order that the methods of this invention may be carried out manually or automatically with television cameras 20, 21 and monitors 22, 23, a control computer 24 is provided as shown in FIG. 10 with provision for an operator or observer to override control of all parameters, such as the shift of images through buffers 25 and 26, magnification factors $q_1$ and $q_2$ through magnification control blocks 27 and 28, the stereoscopic image combiner 29, as well as the parameters of the stereoscopic camera rig 30, including the focal lengths and distance of focus of the camera lenses, the intercamera distance 2 w, and the camera convergence distance V which selects the fronto-parallel plane of convergence $F_{pp}$ and the distance l between the first nodal point of each camera lens and the camera convergence point. While all of these parameters could be set directly by an operator, it is preferred to program the computer for control, and to allow the operator or observer to change the parameters from a central location, such as a computer keyboard, a mouse, a voice recognition system, etc.

In addition to these parameters, the automation may also be employed to control the observer's viewing distance, s, for example, by providing a backrest and headrest which move under computer control with the backrest employed for large changes in viewing distance and the headrest for fine adjustment of viewing distance. Automation of the observer's viewing distance is preferred in order to assure that the condition $s=qD$ is satisfied with some precision.

The system must also have a stereoscopic image presentation system for presenting and separating the left and right eye's images, such as functional block 29 that receives and stores fields from the two buffers 25 and 26 for alternate transmission to one or both monitors and a pair of liquid crystal stereo viewing glasses 31 to synchronize viewing the left and right camera images with interlaced fields of the left and right cameras. The vertical sync signal used to alternate the left and right image fields in the composite video signal transmitted to the monitors may be transmitted directly to the observer's liquid crystal stereo viewing glasses. Although a specific technique for stereoscopic image presentation on a television monitor has been referred to in this example of automation, any stereoscopic image presentation system can be employed with the teachings of this invention.

A similar control system for recording stereoscopic video tapes or motion picture stereoscopic images can also be provided with real-time control for recording by a cinematographer, and with or without real-time control for other stereoscopic viewing purposes, such as entertainment, education and training (with or without special effects) or even for static images of architecture, anatomical parts, etc.

DISCUSSION

A major need in teleoperation is the undistorted presentation of depth information. A true-to-scale representation of the viewed region is desired. A linear scale between y' and y will yield zero erroneously perceived accelerations or decelerations, and remote vehicle driving or remote robotic device teleoperation will be free of risk of collisions caused by these effects.

In order to have a linear scale between y' and y, objects at infinity must appear at infinity. Setting $q=e/w$ for parallel cameras or $q=Ve/wl$ for converged cameras guarantees that objects at infinity will be presented with horizontal monitor disparity equal to the observer's interocular distance. For example, an object at infinity, straight ahead of parallel cameras, will appear directly in front of both cameras. At distance D in the viewed region, the ray paths of the object's two camera images will be 2 w apart. If $q=e/w$, the images will be 2 e apart on the monitor and appear at infinity.

For a true-to-scale representation of the viewed region, the scales of x', y' and z' must be equal. The ratio between the x' and y' scales can be seen to change as a function of s, the observer viewing distance. Compare FIG. 8 with FIG. 1. By setting $s=qD$ for parallel cameras, that ratio is fixed at 1.0. The ratio between the x' and z' scales can be fixed to 1.0 by using parallel cameras and setting $q=e/w$. With this configuration, a true-to-scale representation of the viewed region can be achieved. For converged cameras, $s=ql^2/V$ makes $y'=qy$.

Strunk and Iwamoto [3] describe a parallel camera configuration which presents linear mappings for each of the three visual axes. They accomplish this with shifted stereo images such that images at infinity have a horizontal monitor disparity equal to the observer's interocular distance. However, their "offset-parallel camera arrangement" has several limitations when compared to the suggested configurations of this application.

First, Strunk and Iwamoto do not specify s, where the operator should sit. That is, they do not insure that the ratio of the scales of x', y' and z' are equal, even though they do include this variable, s, in their computed y' scale factor.

Second, they do not vary the scale factor between the camera image plate and the 3-D viewing monitor. They therefore have a fixed plane $(y=D)$ in the viewed region that appears in the plane of the monitor. Their equations imply that they can vary this plane only by changing the focal length of the camera lenses, or the intercamera distance.

In accordance with this invention, by varying the scale factor between the camera image plate and the 3-D viewing monitor, which is implied in varying q, (for example, electronically with a frame buffer), any fronto-parallel plane in the viewed region can be selected to appear in the plane of the monitor without changing the intercamera distance or focal length of the camera lenses. This frees these camera variables to serve as the independent variables controlling the image acuity (height, width and stereo depth) and width of view (wide angle versus telephoto). Thus, image acuity and size and depth of region of interest can both be selected in accordance with the present invention. Simply by using a monitor with a higher resolution than the television camera resolution, it can be assured that reducing q does not result in loss of image resolution.

Third, Strunk and Iwamoto reject converged camera configurations totally. However, in accordance with this invention, three sagittal planes have been found which do, in fact, provide linear depth representations. Further analysis shows that in the mid-sagittal camera plane $(x=0)$, the apparent height of an object remains constant as the object approaches or recedes from the cameras. However, in the two other sagittal planes $(x=\pm w)$, the apparent height of objects will not remain constant, but will vary slightly, as the object approaches or recedes from the cameras.

The distortions discussed have been shown to be possible sources of collisions when operating a teleoperated vehicle or teleoperated robotic device with stereoscopic television as the primary viewing system. These distortions may also cause an unwanted "fly by." Consider a vehicle approaching an object off-center, with the intention of grappling the object from the side. The erroneous perceived decelerations may cause the operator to accelerate the vehicle so that the vehicle passes the object altogether.

The undersea community has been using 3-D television to guide teleoperated salvage and rescue vehicles for a number of years. These vehicles are known to be difficult to operate. The approach paths of such vehicles are sometimes converging spirals with the object being approached in the center of the spiral. Perhaps this is the result of the erroneously perceived decelerations that have been discussed. An operator, perceiving the operated undersea vehicle to slow down, would naturally assume that an undersea current had appeared, and the operator would accelerate the vehicle. The vehicle might well pass alongside the object requiring the operator to turn the vehicle. Such a scenario would lead to the observed spiral approaches.

Many undersea operators had abandoned 3-D television until recently when a new 3-D camera system was introduced with smaller cameras and a smaller intercamera distance. The smaller intercamera distance reduces the absolute value of the (Ve−qwl) term for converged camera configurations and the absolute value of the (e−qw) term for parallel camera configurations, thereby reducing the erroneous perceived decelerations but not eliminating them. This may well explain the revival in usage of undersea 3-D television systems.

I claim:

1. In a stereoscopic viewing system for a human observer, a method of providing a stereoscopic image presentation on a display screen of a viewed three-dimensional region of interest using a left camera and a right camera which, if moving, move in unison relative to said viewed region of interest, or said cameras are viewing moving objects in the region of interest, or said cameras and viewed region are static, each of said cameras having a lens, said lens having a first nodal point, comprising the steps of selecting a fronto-parallel plane in said region of interest, horizontally shifting the presentation of images on said screen so that images from said left and right cameras of a thin, vertical object located in the center of the viewed portion of said fronto-parallel plane overlap completely and exactly on said screen, and selecting a magnification factor q, defined as the scale expansion factor between distances on each camera's plane of equal pixel projection and distances on said display screen, providing a linear relation between perceived and real depth and reducing erroneously perceived accelerations and decelerations.

2. In a stereoscopic viewing system, a method as defined in claim 1 wherein the axes of said left and right cameras are converged to a point on said fronto-parallel plane and said magnification factor q is selected to satisfy a condition $Ve-qwl=0$, where V is the camera convergence distance, e is half the interocular distance of said observer, w is half the intercamera distance and l is the actual distance from said first nodal point of each camera to said convergence point, thereby minimizing erroneously perceived acceleration and deceleration for three sagittal planes, $x=-w$, $x=0$ and $x=+w$, located in said viewed region of interest, where $x=0$ is at the center of said viewed region.

3. A method as defined in claim 2 including the step of providing an overlay displayed on said screen, said overlay comprising indicia on said screen indicating the locations of said sagittal planes, $x=-w$, $x=0$ and $x=+w$.

4. In a stereoscopic viewing system, a method as defined in claim 1 wherein the axes of said left and right cameras are converged to a point on said fronto-parallel plane, including the step of selecting said intercamera distance, 2 w, to satisfy a condition $Ve-qwl=0$ for said image presentation, where V is the camera convergence distance, e is half the interocular distance of said observer, and l is the actual distance from said first nodal point of each camera lens to said convergence point, thereby minimizing erroneously perceived acceleration and deceleration for three sagittal planes, $x=-w$, $x=0$ and $x=+w$, in said viewed region of interest.

5. A method as defined in claim 4 including the step of providing an overlay displayed on said screen, said overlay comprising indicia on said screen indicating the locations of said sagittal planes, $x=-w$, $x=0$ and $x=+w$.

6. A method as defined in claim 5 including the step of positioning an observer at a distance $s=ql^2/V$ from said screen where q is said magnification factor selected to satisfy said condition $q=Ve/wl$ thereby providing minimally distorted stereoscopic views of said viewed region with converged cameras.

7. A method as defined in claim 3 including the step of displaying the same stereoscopic image on a second screen with a different magnification factor q selected to provide a higher depth resolution stereoscopic image of the same region of interest, while simultaneously displaying the original lower depth resolution stereoscopic image with minimal erroneously perceived depth accelerations or decelerations on said display screen.

8. A method as defined in claim 7 wherein said first screen and said second screen are separate partitions of one display screen.

9. A method as defined in claim 8 including the step of positioning an observer at a distance $s=ql^2/V$ from said screen where q is said magnification factor selected to satisfy said condition $q=Ve/wl$, thereby providing minimally distorted stereoscopic views of said viewed region with converged cameras.

10. A method of providing stereoscopic image presentation of objects using left and right converged cameras as defined in claim 2 including the step of selecting a new fronto-parallel plane of interest in said viewed region of interest, horizontally shifting said images from said left and right cameras on said screen so that said left and right camera images of a thin, vertical object located in the center of the viewed portion of said newly selected plane overlap completely and exactly on said screen, and then changing said magnification factor to $q=Ve/wl$ where q is defined in terms of said newly selected planes of equal pixel projection that are parallel to said camera image collection plates of said left and right cameras and intersect said newly selected fronto-parallel plane of interest and a line between said cameras that bisects the angle of convergence of said cameras.

11. A method as defined in claim 10 including the step of positioning an observer at a distance $s=ql^2/V$ from said screen where q is said magnification factor selected to satisfy said condition $q=Ve/wl$, thereby providing minimally distorted stereoscopic views of said viewed region with converged cameras.

12. In a stereoscopic viewing system for a human observer, a method of providing a stereoscopic image presentation on a display screen of a viewed three-dimensional region of interest using two cameras converged on a point on a fronto-parallel plane of interest in said viewed region of interest, wherein said cameras with an intercamera distance, 2 w, which, if moving, move in unison relative to said viewed region of interest or said cameras are viewing moving objects in said region of interest, or said cameras and viewed region are static, each of said cameras having a lens, said lens having a first nodal point, said method comprising the step of selecting said intercamera distance to satisfy a condition $Ve-qwl=0$ for said image presentation, where V is the camera convergence distance, e is half the interocular distance of said observer, q is a magnification factor defined as the scale expansion factor between distances on each camera's plane of equal pixel projection and distances on said display screen, and l is the actual distance from said first nodal point of each of said cameras to said convergence point, thereby providing a linear relation between perceived and real depth and minimizing erroneously perceived acceleration and deceleration for three sagittal planes, $x = -w$, $x = 0$ and $x = +w$, located in said viewed region of interest.

13. A method as defined in claim 12 including the step of positioning an observer at a distance $s = ql^2/V$ from said screen where q is said magnification factor selected to satisfy said condition $q = Ve/wl$, thereby providing minimally distorted stereoscopic views of said viewed region with converged cameras.

14. In a stereoscopic viewing system for a human observer, a method of providing stereoscopic image presentation on a display screen of a viewed three-dimensional region of interest using two converged cameras which, if moving, move in unison relative to said viewed region of interest, or said cameras are viewing moving objects in said region of interest, or said cameras and viewed region are static, the steps of selecting a fronto-parallel plane of interest in said viewed region of interest, horizontally shifting the images on said screen so that the left and right camera images of a thin, vertical object located in the center of the viewed portion of said selected fronto-parallel plane overlap completely and exactly on said screen, and selecting a display magnification factor q defined as the scale expansion between distances on said cameras' planes of equal pixel projection in said viewed region of interest that are parallel to said camera image collection plates of said left and right cameras and intersect said selected fronto-parallel plane of interest and a line between said cameras that bisects the angle of convergence of said cameras, so that the stereoscopic image of an object at infinity is displayed on said screen with a horizontal screen disparity $\Delta T = T_{nr} - T_{nl} = 2e$, where 2e is the interocular distance of said observer and $T_{nl}$ and $T_{nr}$ are corresponding locations on said screen at the centers of left and right stereoscopic images of said object at infinity.

15. A method as defined in claim 14 including the step of positioning an observer at a distance $s = ql^2/V$ from said screen where q is said magnification factor selected to satisfy said condition $q = Ve/wl$, thereby providing minimally distorted stereoscopic views of said viewed region with converged cameras, V is the camera convergence distance, e is half the interocular distance of said observer, w is half the intercamera distance and l is the actual distance from said first nodal point of each camera to said convergence point.

16. In a stereoscopic viewing system for a human observer, a method of providing a stereoscopic image presentation on a display screen of a viewed three-dimensional region of interest using a left camera and a right camera that are converged on a point on a fronto-parallel plane of interest in said viewed region of interest, and which, if moving, move in unison relative to said viewed region of interest, or said cameras are viewing moving objects in said region of interest, or said cameras and viewed region are static, comprising the step of shifting images from said left and right converged cameras so that the stereoscopic image of an object at infinity is displayed on said screen with a horizontal screen disparity $\Delta T = T_{nr} - T_{nl} = 2e$, where 2e is the interocular distance of said observer and $T_{nl}$ and $T_{nr}$ are corresponding locations on said screen at the centers of left and right stereoscopic images of said object at infinity.

17. A method as defined in claim 16 including the step of positioning an observer at a distance $s = ql^2/V$ from said screen where q is said magnification factor selected to satisfy said condition $q = Ve/wl$, thereby providing minimally distorted stereoscopic views of said viewed region with converged cameras, V is the camera convergence distance, e is half the interocular distance of said observer, w is half the intercamera distance and l is the actual distance from said first nodal point of each camera to said convergence point.

18. In a stereoscopic viewing system for a human observer, a method as defined in claim 1 of providing a stereoscopic image presentation on a display screen of a viewed three-dimensional region of interest using parallel left and right cameras, selecting for a fronto-parallel plane of interest $y = D$ located at a camera viewing distance D from the line between said first nodal points of said lenses of said left and right cameras, said camera viewing distance being the perpendicular distance from the center of said line between said first nodal point to the center of said region of interest, focusing said left and right cameras so that the center of the depth of the focused region lies on said plane $y = D$ at said camera viewing distance D, horizontally shifting on said screen images from said left and right cameras so that left and right camera images of a thin vertical object located in the center of the viewed portion of said plane $y = D$ overlap completely and exactly on said screen, and selecting a magnification factor $q = e/w$, where e is half the interocular distance of said observer and w is half the intercamera distance, thereby providing a linear relation between perceived and real depth and eliminating erroneously perceived accelerations and decelerations in depth for the entire viewed region of interest.

19. A method as defined in claim 18 including selecting a new fronto-parallel plane of interest, shifting images for the newly selected plane, and selecting a new magnification factor q defined for said newly selected plane, so that $q = e/w$.

20. A method as defined in claim 19, including the step of positioning an observer at a distance $s = qD$ from said screen where D is said selected camera viewing distance and q is said magnification factor selected to satisfy said condition $q = e/w$, thereby providing fully undistorted, true-to-scale stereoscopic views of objects in said viewed region of interest.

21. In a stereoscopic viewing system for a human observer, a method of providing a stereoscopic image presentation with special effects on a display screen of a viewed three-dimensional region of interest using a left camera and a right camera which, if moving, move in unison relative to said viewed region of interest, or said cameras are viewing moving objects in said region of interest, or said cameras and viewed region are static, and said special effects consist of producing the erroneous perception of accelerations or decelerations of said left and right cameras in unison relative to said region of interest, or producing the erroneous perception of accelerations or decelerations of objects in said region of interest, when there are motions in fact with neither accelerations nor decelerations, or to produce a nonlinear relation between perceived and real depth when there are no motions, each of said cameras having a lens, said lens having a first nodal point, comprising the steps of selecting a fronto-parallel plane in said region of interest, horizontally shifting the presentation of images on said screen so that images from said left and right camera of a thin, vertical object located in the center of the viewed portion of said fronto-parallel plane overlap completely and exactly on said screen, and selecting a magnification factor q, defined as the scale expansion factor between distances on each camera's plane of equal pixel projection and distances on said display screen.

22. In a stereoscopic viewing system for a human observer, a method of providing a stereoscopic image presentation with special effects on a display screen of a viewed three-dimensional region of interest using a left camera and a right camera which, if moving, move in unison relative to said viewed region of interest, or said cameras are viewing moving objects in the region of interest, and said special effects consist of erroneously enhancing the perception of accelerations or decelerations of said left and right cameras in unison relative to said region of interest, or erroneously enhancing the perception of accelerations or decelerations of objects in said region of interest, when there are in fact some accelerations or decelerations, each of said cameras having a lens, said lens having a first nodal point, comprising the steps of selecting a fronto-parallel plane in said region of interest, horizontally shifting the presentation of images on said screen so that images from said left and right camera of a thin, vertical object located in the center of the viewed portion of said fronto-parallel plane overlap completely and exactly on said screen, and selecting a magnification factor q, defined as the scale expansion factor between distances on each camera's plane of equal pixel projection and distances on said display screen, to produce a nonlinear relation between perceived and real depth, and erroneously enhancing perceived accelerations and decelerations.

23. In a stereoscopic viewing system, a method as defined in claim 21 for producing special effects wherein the axes of said left and right cameras are converged at a point on said fronto-parallel plane and said magnification factor q is selected to not satisfy a condition $Ve - qwl = 0$, where V is the camera convergence distance, e is half the interocular distance of said observer, w is half the intercamera distance and l is the actual distance from said first nodal point of each camera to said convergence point, thereby intentionally producing erroneously perceived accelerations and decelerations.

24. In a stereoscopic viewing system, a method as defined in claim 21 wherein the axes of said left and right cameras are converged at a point on said fronto-parallel plane including the step of selecting said intercamera distance, 2w, which does not satisfy a condition $Ve - qwl = 0$ for said image presentation, where V is the camera convergence distance, e is half the interocular distance of said observer, and l is the actual distance from said first nodal point of each camera lens to said convergence point, thereby intentionally producing erroneously perceived accelerations and decelerations.

25. A method as defined in claim 24 including the step of positioning an observer at a distance $s = ql^2/V$ from said screen thereby providing minimally distorted stereoscopic views of said viewed region for converged cameras with special effects.

26. A method of providing stereoscopic image presentation of objects using left and right converged cameras as defined in claim 23 including the step of selecting a new fronto-parallel plane of interest in said viewed region of interest, horizontally shifting said images from said left and right cameras on said screen so that said left and right camera images of a thin, vertical object located in the center of the viewed portion of said newly selected plane overlap completely and exactly on said screen, and then changing said magnification factor to not satisfy the condition $q = Ve/wl$ where q is defined in terms of said newly selected planes of equal pixel projection that are parallel to said camera image collection plates of said left and right cameras and intersect said newly selected fronto-parallel plane of interest and a line between said cameras that bisects the angle of convergence of said cameras.

27. A method as defined in claim 26 including the step of positioning an observer at a distance $s = ql^2/V$ from said screen thereby providing minimally distorted stereoscopic views of said viewed region for converged cameras with special effects.

28. In a stereoscopic viewing system, a method as defined in claim 22 for producing special effects wherein the axes of said left and right cameras are converged at a point on said fronto-parallel plane and said magnification factor q is selected to not satisfy a condition $Ve - qwl = 0$, where V is the camera convergence distance, e is half the interocular distance of said observer, w is half the intercamera distance and l is the actual distance from said first nodal point of each camera to said convergence point, thereby intentionally enhancing erroneously perceived accelerations and decelerations.

29. In a stereoscopic viewing system, a method as defined in claim 22 wherein the axes of said left and right cameras are converged at a point on said fronto-parallel plane including the step of selecting said intercamera distance, 2w, which does not satisfy a condition $Ve - qwl = 0$ for said image presentation, where V is the camera convergence distance, e is half the interocular distance of said observer, and l is the actual distance from said first nodal point of each camera lens to said convergence point, thereby intentionally enhancing erroneously perceived accelerations and decelerations.

30. A method as defined in claim 29 including the step of positioning an observer at a distance $s = ql^2/V$ from said screen thereby providing minimally distorted stereoscopic views of said viewed region for converged cameras with special effects.

31. A method of providing stereoscopic image presentation of objects using left and right converged cameras as defined in claim 28 including the step of selecting a new fronto-parallel plane of interest in said viewed region of interest, horizontally shifting said images from said left and right cameras on said screen so that said left and right camera images of a thin, vertical object located in the center of the viewed portion of said newly selected plane overlap completely and exactly on said screen, and then changing said magnification factor to not satisfy the condition $q = Ve/wl$ where q is defined in terms of said newly selected planes of equal pixel projection that are parallel to said camera image collection plates of said left and right cameras and intersect said newly selected fronto-parallel plane of interest and a line between said cameras that bisects the angle of convergence of said cameras.

32. A method as defined in claim 31 including the step of positioning an observer at a distance $s = ql^2/V$ from said screen thereby providing minimally distorted stereoscopic views of said viewed region for converged cameras with special effects.

33. In a stereoscopic viewing system for a human observer, a method of providing a stereoscopic image presentation with special effects on a display screen of a viewed three-dimensional region of interest using a left camera and a right camera which, if moving, move in unison relative to said viewed region of interest, or said cameras are viewing moving objects in said region of interest, or said cameras and viewed region are static, said special effects consisting of producing the erroneous perception of accelerations or decelerations of said left and right cameras in unison relative to said region of interest, or producing the erroneous perception of accelerations or decelerations of objects in said region of interest, when there are motions in fact with neither accelerations nor decelerations, or to produce a nonlinear relation between perceived and real depth when there are no motions, using parallel left and right cameras, selecting a fronto-parallel plane of interest $y=D$ located at a camera viewing distance D from the line between said first nodal points and said lenses of said left and right cameras, said camera viewing distance being the perpendicular distance from the center of said line between said first nodal points to the center of said region of interest, focusing said left and right cameras so that the center of the depth of the focused region lies on said plane $y=D$ at said camera viewing distance D, horizontally shifting on said screen images from said left and right cameras so that left and right camera images of a thin vertical object located in the center of the viewed portion of said plane $y=D$ overlap completely and exactly on said screen, and selecting a magnification factor q which does not satisfy the condition $q=e/w$, where e is half the interocular distance of said observer and w is half the intercamera distance, thereby producing a nonlinear relation between perceived and real depth, and producing erroneously perceived accelerations and decelerations in depth for the entire viewed region of interest.

34. A method as defined in claim 33 including the step of positioning an observer at a distance $s=qD$ from said screen where D is said selected viewing distance and q is said magnification factor selected to not satisfy said condition $q=e/w$, thereby providing minimally distorted stereoscopic views with special effects of objects accelerating and decelerating in said viewed region.

35. In a stereoscopic viewing system for a human observer, a method of providing a stereoscopic image presentation with special effects on a display screen of a viewed three-dimensional region of interest, using a left camera and a right camera which, if moving, move in unison relative to said viewed region of interest, or said cameras are viewing moving objects in said region of interest, said special effects consisting of erroneously enhancing the perception of accelerations or decelerations of said left and right cameras in unison relative to said region of interest, or erroneously enhancing the perception of accelerations or decelerations of objects in said region of interest, when there are in fact some accelerations or decelerations, using parallel left and right cameras, selecting a fronto-parallel plane of interest $y=D$ located at a camera viewing distance D from the line between said first nodal points of said lenses of said left and right cameras, said camera viewing distance being the perpendicular distance from the center of said line between said first nodal points to the center of said region of interest, focusing said left and right cameras so that the center of the depth of the focused region lies on said plane $y=D$ at said camera viewing distance D, horizontally shifting on said screen images from said left and right cameras so that left and right camera images of a thin vertical object located in the center of said plane $y=D$ overlap completely and exactly on said screen, and selecting a magnification factor q which does not satisfy the condition $q=e/w$, where e is half the interocular distance of said observer and w is half the intercamera distance, thereby producing a nonlinear relation between perceived and real depth, and erroneously enhancing perceived accelerations and decelerations in depth for the entire viewed region of interest.

36. A method as defined in claim 35 including the step of positioning an observer at a distance $s=qD$ from said screen where D is said selected viewing distance and q is said magnification factor selected to not satisfy said condition $q=e/w$, thereby providing minimally distorted stereoscopic views with special effects of objects accelerating and decelerating in said viewed region.

* * * * *